US012321385B1

(12) United States Patent
Williams et al.

(10) Patent No.: US 12,321,385 B1
(45) Date of Patent: Jun. 3, 2025

(54) AUTOMATED IDENTIFICATION OF LABELS FOR VIDEOS WITH A LABELING SERVICE WITHIN A SERVICE PROVIDER NETWORK

(71) Applicant: Amazon Technologies, Inc., Seattle, WA (US)

(72) Inventors: Alex Williams, Johnson City, TN (US); Weifeng Chen, Redmond, WA (US); Patrick Guy Haffner, Atlantic Highlands, NJ (US); Matthew Alan Lease, Austin, TX (US); Li Erran Li, Palo Alto, CA (US); Kumar Hemachandra Chellapilla, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 18/129,655

(22) Filed: Mar. 31, 2023

(51) Int. Cl.
*G06F 16/75* (2019.01)
*G06F 16/71* (2019.01)
*G06F 16/738* (2019.01)
*G06F 16/78* (2019.01)
*G06V 20/40* (2022.01)

(52) U.S. Cl.
CPC .............. *G06F 16/75* (2019.01); *G06F 16/71* (2019.01); *G06F 16/738* (2019.01); *G06F 16/7867* (2019.01); *G06V 20/41* (2022.01)

(58) Field of Classification Search
CPC ........ G06F 16/75; G06F 16/71; G06F 16/738; G06F 16/7867; G06V 20/41
See application file for complete search history.

(56) References Cited

U.S. PATENT DOCUMENTS

| 8,930,288 | B2 * | 1/2015 | Toderici | G06V 20/41 |
| | | | | 706/12 |
| 10,984,340 | B2 * | 4/2021 | Hsiao | G06N 20/20 |
| 11,048,979 | B1 * | 6/2021 | Zhdanov | G06F 18/2155 |
| 11,983,244 | B1 * | 5/2024 | Zhdanov | G06F 16/686 |
| 2018/0020243 | A1 * | 1/2018 | Ni | H04N 21/23418 |
| 2020/0019786 | A1 * | 1/2020 | Robert | G06V 10/75 |
| 2020/0380311 | A1 * | 12/2020 | Lourentzou | G06F 40/169 |
| 2022/0121975 | A1 * | 4/2022 | Granström | G06N 20/00 |

OTHER PUBLICATIONS

George Toderici et al., "Finding Meaning on YouTube: Tag Recommendation and Category Discovery", IEEE, pp. 3447-3454 (Year: 2010).*

\* cited by examiner

*Primary Examiner* — Jared M Bibbee
(74) *Attorney, Agent, or Firm* — Nicholson De Vos Webster & Elliott LLP

(57) ABSTRACT

This disclosure describes automatically identifying videos of a video dataset having high-content similarity and grouping the videos together with one or more possible tags for the videos for consideration by annotators. A labeling service of a service provider network receives (i) a dataset of unlabeled videos and (ii) category tags for labeling the videos from a client device associated with a user. A video data modeling engine analyzes the dataset to provide a set of ranked unlabeled videos from the dataset, wherein the set of ranked unlabeled videos are ranked according to confidence scores with respect to at least one tag. Based at least in part on the confidence scores, at least some of the unlabeled videos are labeled with the at least one tag to provide a dataset of labeled videos. The dataset of labeled videos is provided to a database and/or the user.

15 Claims, 12 Drawing Sheets

500 ⟶

```
┌─────────────────────────────────────────────────────────────────────────────┐
│ RECEIVE, FROM A CLIENT DEVICE AT A LABELING SERVICE OF A SERVICE PROVIDER   │
│ NETWORK, (I) A DATASET OF UNLABELED VIDEOS AND (II) CATEGORY TAGS RELATED   │
│ TO CONTENT OF THE UNLABELED VIDEOS FOR LABELING THE VIDEOS                  │
│                                    502                                      │
└─────────────────────────────────────────────────────────────────────────────┘
                                     ↓
┌─────────────────────────────────────────────────────────────────────────────┐
│ ANALYZE, BY A VIDEO MODELING ENGINE OF THE LABELING SERVICE, THE DATASET    │
│ TO PROVIDE A SET OF RANKED UNLABELED VIDEOS FROM THE DATASET, WHEREIN THE   │
│ SET OF RANKED UNLABELED VIDEOS ARE RANKED ACCORDING TO CONFIDENCE SCORES    │
│ WITH RESPECT TO AT LEAST ONE TAG                                            │
│                                    504                                      │
└─────────────────────────────────────────────────────────────────────────────┘
                                     ↓
┌─────────────────────────────────────────────────────────────────────────────┐
│ BASED ON THE CONFIDENCE SCORES, LABEL AT LEAST SOME OF THE SET OF RANKED    │
│ UNLABELED VIDEOS WITH THE AT LEAST ONE TAG TO PROVIDE A DATASET OF LABELED  │
│ VIDEOS, WHEREIN (I) A FIRST RANKED UNLABELED VIDEO HAVING A FIRST           │
│ CONFIDENCE SCORE AT OR ABOVE A FIRST THRESHOLD IS AUTOMATICALLY LABELED     │
│ WITH THE AT LEAST ONE TAG, (II) A SECOND RANKED UNLABELED VIDEO HAVING A    │
│ SECOND CONFIDENCE SCORE AT OR ABOVE A SECOND THRESHOLD THAT IS LESS THAN    │
│ THE FIRST THRESHOLD IS PRESENTED TO AN ANNOTATOR FOR MANUAL LABELING        │
│ WITH THE AT LEAST ONE TAG, AND (III) A THIRD RANKED UNLABELED VIDEO HAVING  │
│ A THIRD CONFIDENCE SCORE BELOW THE SECOND THRESHOLD IS PRESENTED TO THE     │
│ ANNOTATOR FOR MANUAL LABELING WITH A TAG FROM THE CATEGORY TAGS             │
│                                    506                                      │
└─────────────────────────────────────────────────────────────────────────────┘
                                     ↓
┌─────────────────────────────────────────────────────────────────────────────┐
│ VERIFY AT LEAST SOME LABELED VIDEOS OF THE DATASET OF LABELED VIDEOS WITH   │
│ RESPECT TO THE AT LEAST ONE TAG TO PROVIDE A VERIFIED DATASET OF LABELED    │
│ VIDEOS                                                                      │
│                                    508                                      │
└─────────────────────────────────────────────────────────────────────────────┘
                                     ↓
┌─────────────────────────────────────────────────────────────────────────────┐
│          STORE THE VERIFIED DATASET OF LABELED VIDEOS IN A DATABASE         │
│                                    510                                      │
└─────────────────────────────────────────────────────────────────────────────┘
```

```
┌─────────────────────────────────────────────────────────────────────────┐
│ RECEIVE, FROM A CLIENT DEVICE AT A LABELING SERVICE OF A SERVICE        │
│ PROVIDER NETWORK, (I) A DATASET OF UNLABELED VIDEOS AND (II) CATEGORY   │
│ TAGS FOR LABELING THE UNLABELED VIDEOS                                  │
│                                                                         │
│                                   602                                   │
└─────────────────────────────────────────────────────────────────────────┘
                                     │
                                     ▼
┌─────────────────────────────────────────────────────────────────────────┐
│ ANALYZE, BY A MACHINE LEARNING (ML) MODEL OF THE LABELING SERVICE, THE  │
│ DATASET TO PROVIDE A SET OF RANKED UNLABELED VIDEOS FROM THE DATASET,   │
│ WHEREIN THE SET OF RANKED UNLABELED VIDEOS ARE RANKED ACCORDING TO      │
│ CONFIDENCE SCORES WITH RESPECT TO AT LEAST ONE TAG                      │
│                                                                         │
│                                   604                                   │
└─────────────────────────────────────────────────────────────────────────┘
                                     │
                                     ▼
┌─────────────────────────────────────────────────────────────────────────┐
│ BASED AT LEAST IN PART ON THE CONFIDENCE SCORES, LABEL AT LEAST SOME OF │
│ THE UNLABELED VIDEOS WITH THE AT LEAST ONE TAG TO PROVIDE A DATASET OF  │
│ LABELED VIDEOS                                                          │
│                                                                         │
│                                   606                                   │
└─────────────────────────────────────────────────────────────────────────┘
                                     │
                                     ▼
┌─────────────────────────────────────────────────────────────────────────┐
│            STORE THE DATASET OF LABELED VIDEOS IN A DATABASE            │
│                                                                         │
│                                   608                                   │
└─────────────────────────────────────────────────────────────────────────┘
```

FIG. 6

AUTOMATED IDENTIFICATION OF LABELS FOR VIDEOS WITH A LABELING SERVICE WITHIN A SERVICE PROVIDER NETWORK

BACKGROUND

Service providers offer cloud-based services via service provider networks to fulfill user's computing-service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Service provider networks often include a labeling service. With such labeling services, users provide an image dataset, e.g., still images, video images, etc. The labeling service labels the image dataset, usually using annotators to perform the labeling. In particular, video content classification is the task of classifying a given video with one or more categorical labels that describe the video's content. Unlike many other annotation settings with static media (e.g., image classification), video content classification tasks are often particularly time-consuming due to the fundamental need to observe the entirety of the media in order to ensure an accurate label is being assigned by a user. For this reason, conventional video content classification systems generally require users to apply labels to videos one-by-one in a linear fashion. This is particularly problematic for labeling tasks that involve a large number of labels and/or videos. This can result in large amounts of time, utilization of a significant amount of computing resources, annotator efforts, and associated costs when labeling videos.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a flow diagram of an example method for automatically identifying videos of a video dataset having high-content similarity and grouping the videos together with one or more possible tags for the videos for consideration by annotators.

FIG. 6 is a flow diagram of another example method for automatically identifying videos of a video dataset having high-content similarity and grouping the videos together with one or more possible tags for the videos for consideration by annotators.

DETAILED DESCRIPTION

Figure 1A:
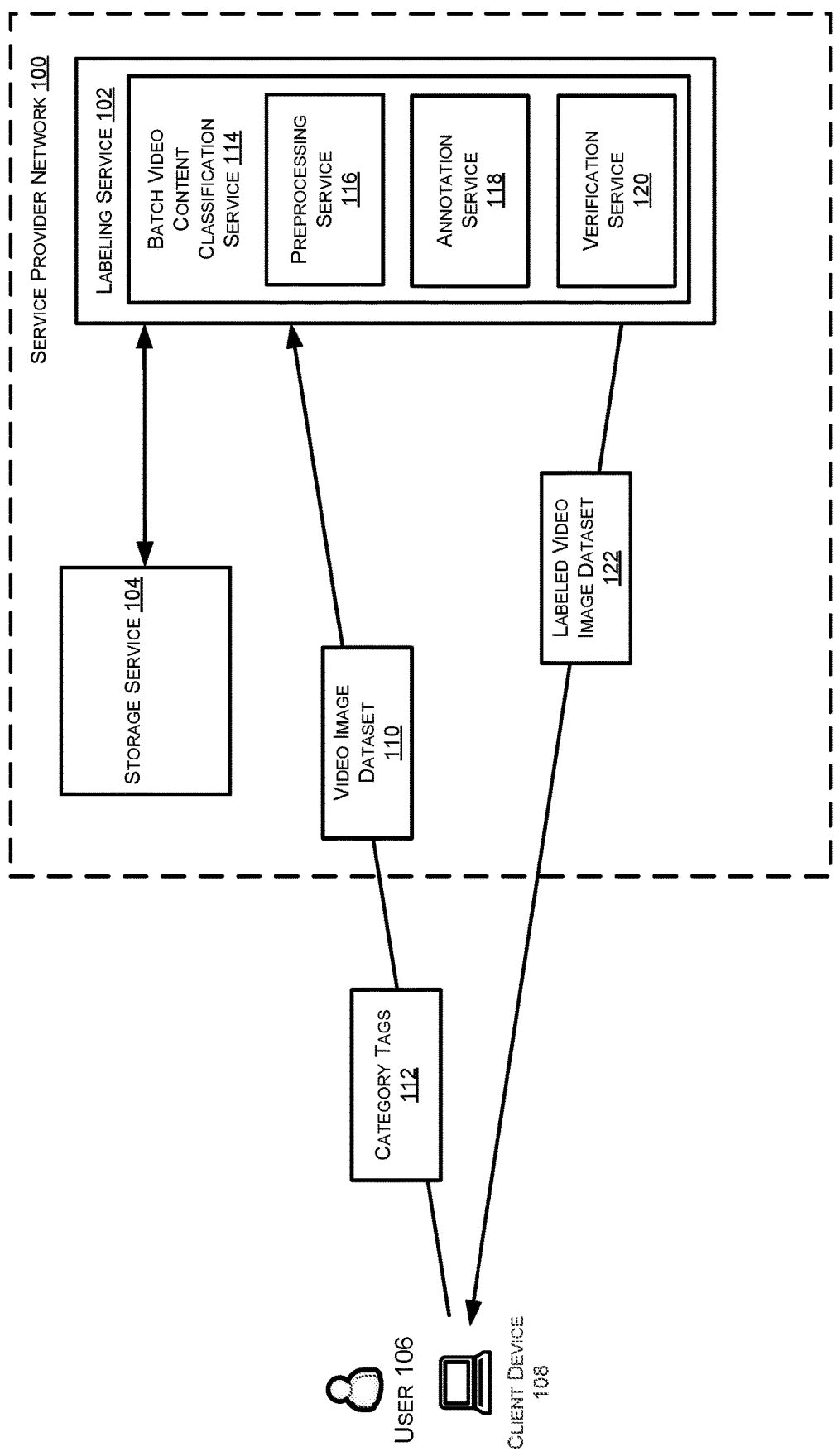
FIG. 1A schematically illustrates a system-architecture diagram of an example service provider network that includes a labeling service that provides an automated process for estimating needed resources and estimating associated costs associated with labeling of image datasets by the labeling service within the service provider network.

This disclosure describes, at least in part, techniques and architecture for a machine-powered system architecture to automatically identify videos of high content similarity and arrange them in a grid-like interface for accelerated completion of labeling. More particularly, a labeling service of a service provider network includes a batch video content classification service that automatically identifies videos having high-content similarity and groups the videos together with one or more possible tags for the videos for consideration by annotators. In configurations, the batch video content classification service uses confidence scores with respect to one or more tags for the grouping of videos and if the confidence score is high, e.g., above a predetermined threshold, the batch video content classification service may label one or more of the videos.

For example, users may provide a dataset of M unlabeled media objects (i.e., videos) and N category tags that should be used to label these videos. The ultimate goal of video classification is to develop a mapping between the media objects and tags, which can be fundamentally framed in two approaches.

In configurations, binary classification may be considered a way to model a labeling problem, while annotation is how it translates into a labeling task. The overall task is a multi-label classification that can be decomposed into one binary classification per task. There are two labeling approaches to obtain exactly the same multi-label classification model that can then be used to either train a single multi-label classification or several binary classification models. One approach includes conventional manual labeling, where examples are examined sequentially once and may be referred to as multi-label annotation. Another approach includes binary annotation that is not conventional since it is considered too inefficient with a standard user interface.

In configurations, a labeling service of a service provider network includes a machine learning model in the form of a video data modeling engine (VDME). In accordance with configurations described herein, as a first step (which may be referred to as preprocessing), the video data modeling engine operates as a routing algorithm that produces a confidence score that dictates how video data should be handled in the labeling pipeline. If a confidence score is high, e.g., above a first threshold, the video data may be auto-labeled with a machine-generated classification.

In configurations, if a confidence score is medium, e.g., above a second threshold but lower than the first threshold, the video data may be labeled by human annotators using a batch classification user interface (referred to herein as a group-view mode interface or a single-view mode interface, as described further herein). If a confidence score is low, e.g., below the second threshold, the video data may be labeled by human annotators using a conventional annotation interface. If either interface should be used, the routing algorithm automatically produces a user interface configuration file that will be passed to the user interface in order to control how the video data should be presented.

In configurations, the video data modeling engine calculates confidence scores using (1) a ranked ordering of the video dataset for each label and (2) a thresholding mechanism that is applied to the list, which is used as a heuristic to guide the video data modeling engine in determining which interface should be used to label a given video. The premise of the ranked ordering is that videos that are "more relevant" to the label at hand should be shown to the annotator first. The practical reasoning behind the goal of producing these outputs is two-fold: 1) to direct video data to an appropriate labeling interface and 2) to, when possible, avoid sending video data to human annotators in any capacity.

In configurations, the video data modeling engine operates by extracting multi-model embeddings that describe the information in each video (e.g., audio transcriptions, video content, etc.). In configurations, the machine learning model used to extract the embeddings is generally using contrastive learning: embeddings are made closer for videos on similar topics, and further for videos on different topics. In addition to the raw video format, in configurations, the video data modeling engine may uses a video summarization model to automatically extract video frames that adequately summarize the video's content. Often, the users may supply examples of labeled videos with the dataset and category tags. The examples of labeled videos may be used to train the models with the video data modeling engine. Additionally, videos from the dataset that are successfully labeled by the batch video content classification service of the labeling service may be used to train the models of the video data modeling engine. When little labeled data is available, the system may employ an unsupervised approach (i.e., clustering) to facilitate each of these procedures.

In accordance with configurations described herein, as a second step (which may be referred to as annotation), the batch video content classification service reads the ranked list of videos and the user interface configuration file from the video data modeling engine in a Video Annotation User Interface (VAUI) that supports binary classification.

Using the ranked list and configuration file, the VAUI may render videos using one of the following viewing modes and interfaces: single-view mode and group-view mode. In the single-view mode, the single-view interface requires annotators to label videos one-by-one and is intended for uses where videos are dissimilar from other videos in the dataset. In the group-view mode, the group-view interface allows annotators to apply labels to several videos simultaneously. The group-view mode is specifically designed for use in labeling videos of high similarity (e.g., in which applying the same label among the videos is highly likely). For binary classification tasks, annotators can apply single labels to individual videos by clicking on the video, which will assign the task's one and only label to the video. For multi-class classification tasks, annotators can select one or more labels at the same time and apply them in aggregate by clicking on a video. This second step requires that only a single annotator apply a label to a dataset of videos.

In configurations, an annotator may not label all of the videos presented to them. For example, the annotator may not agree with the label(s) presented to them by the video data modeling engine during the preprocessing step. Additionally, the annotator may be undecided as to which label(s) may apply to the video(s). The videos that are not labeled may be re-analyzed by the video data modeling engine and then presented to the same or a different annotator again. This may be especially practical as the models of the video data modeling engine may be further trained with videos from the dataset that have been successfully labeled.

In accordance with configurations described herein, as a third step (which may be referred to as verification), the batch video content classification service may create a subsequent labeling task that asks an annotator to verify the labels assigned to videos in the annotation step. Similar to the annotation step, the annotator is asked to review the relevance of one label for each video in the video dataset. However, unlike the annotation step, the batch video content classification service may only ask the annotator to verify the subset of videos in the dataset that have already been assigned a label during the annotation step. For example, if only 10 videos of a 1,000-video dataset were labeled in the annotation step, the verification task may ask the annotator to review these 10 videos. The verification task's design is motivated by data from on-going research that suggests that annotators produce an overabundance of false positives in the annotation step as a by-product of being encouraged to label video media that should "probably be labeled" with a given label. In other words, the batch video content classification service's annotation step promotes making an overabundance of snap-decisions in order to reduce time in both the annotation step and the verification step. In configurations, the verification process may include assigning a confidence score to the labeled video that reflects a confidence level with respect to the labeling of the video. In configurations, the verification step may be omitted due to, for example, user instructions, user time requirements, user quality requirements, etc. Also, in configurations, videos that have been auto-labeled with a machine-generated classification due to having a high confidence score, e.g., above a first threshold, may or may not be verified depending on a user's desires and/or the configuration of the batch video content classification service.

In configurations, the batch video content classification service acknowledges the verification as a criteria of success for producing high-quality labels. If a label-video pair is verified by the annotator, the pair is added to the system output of high-quality data that may be stored in a database. In configurations, if verification fails, the batch video content classification service may re-issue the verification task for to a different annotator up to one or two times (or even more times if desired). If verification fails a third time, the video-label pair may be reanalyzed by the video data modeling engine or may flagged as being inappropriate for use in the batch video content classification infrastructure and should be labeled by alternative means (e.g., a standard classification workflow). As previously noted, successfully labeled videos may be used to train the models of the video data modeling engine. Once all videos have been labeled, the labeling service may provide a labeled data.

As an example, in configurations, a method may include receiving, from a client device at a labeling service of a service provider network, (i) a dataset of unlabeled videos and (ii) category tags for labeling the unlabeled videos. The method may also include analyzing, by a machine learning (ML) model of the labeling service, the dataset to provide a set of ranked unlabeled videos from the dataset, wherein the set of ranked unlabeled videos are ranked according to confidence scores with respect to at least one tag. Based at least in part on the confidence scores, the method may also include labeling at least some of the unlabeled videos with the at least one tag to provide a dataset of labeled videos and storing the dataset of labeled videos in a database.

In configurations, the method may include prior to storing the dataset of labeled videos in a database, reviewing, by a first annotator, at least some of the labeled videos of the dataset of labeled videos with respect to the at least one tag.

In configurations, the method may include determining that a labeled video of the at least some of the labeled videos fails first verification by the first annotator and reviewing, by a second annotator and based at least in part on the labeled video failing the first verification by the first annotator, the labeled video with respect to the at least one tag. Such a method may also include based at least in part on a first determination that the labeled video fails second verification by the second annotator, reviewing, by a third annotator, the labeled video with respect to the at least one tag and based at least in part on a second determination that the labeled video fails third verification by the third annotator, flagging the labeled video for labeling the labeled video via an alternative means.

In configurations, the confidence scores include a first confidence score and the method may further include based at least in part on the reviewing, assigning, to the at least some of the labeled videos by the first annotator, a second confidence score with respect to the at least some of the videos being labeled with the at least one tag.

In configurations, the (i) a first ranked unlabeled video having a first confidence score at or above a first threshold is automatically labeled with the at least one tag, (ii) a second ranked unlabeled video having a second confidence score at or above a second threshold that is less than the first threshold is presented to an annotator for manual labeling with the at least one tag, and (iii) a third ranked unlabeled video having a confidence score below the second threshold is presented to the annotator for manual labeling with a tag from the category tags.

In configurations, the method may include selecting, by the ML model, a group-view mode interface configured to present multiple videos simultaneously to the annotator on a display, presenting on the display, to the annotator by the ML model using the group-view mode interface, a group of ranked unlabeled videos having confidence scores at or above the second threshold and below the first threshold, and labeling, by the annotator interacting with the group-view mode interface, one or more of the group of ranked unlabeled videos with the at least one tag. In such configurations, the method may further include presenting on the display, to the annotator by the ML model using the group-view mode interface, multiple tags for labeling the group of ranked unlabeled videos, and labeling, by the annotator, one or more videos of the group of ranked unlabeled videos with two or more of the multiple tags.

In configurations, the method may include selecting, by the ML model, a single-view mode interface configured to present single videos to the annotator on a display, presenting on the display, to the annotator by the ML model using the single-view mode interface, the second ranked unlabeled video having a confidence score at or above the second threshold and below the first threshold, and labeling, by the annotator interacting with the single-view mode interface, the second ranked unlabeled video with the at least one tag. In such configurations, the method may further include selecting, by the ML model, a single-view mode interface configured to present single videos to the annotator on a display, presenting on the display, to the annotator by the ML model using the single-view mode interface, a first ranked unlabeled video having a confidence score above the second threshold and below the first threshold, and labeling, by the annotator interacting with the single-view mode interface, the first ranked unlabeled video with the at least one tag.

Thus, the techniques and architecture described herein provide a machine-powered system architecture to automatically identify videos of high content similarity and arrange them in a grid-like interface for accelerated completion of labeling. More particularly, a labeling service of a service provider network includes a batch video content classification service that automatically identifies videos having high-content similarity and groups the videos together with one or more possible tags for the videos for consideration by annotators. In configurations, the batch video content classification service uses confidence scores with respect to one or more tags for the grouping of videos and if the confidence score is high, e.g., above a predetermined threshold, the batch video content classification service may label one or more of the videos. Thus, the techniques and architecture may enable the completion of video classification tasks with a novel annotation interface that supports single-view mode (i.e., labeling only one video) and group-view mode (i.e., labeling multiple videos at the same time). The techniques and architecture may also improve annotation speed by designing an annotation interface and workflow that encourages annotators to make rapid, snap-decisions for video classification, thereby saving resources and time and improving costs. The techniques and architecture may improve annotation speed by allowing annotators to simultaneously watch multiple videos and apply tags to them. The techniques and architecture may also improve annotation speed by automatically determining user interface mode (e.g., single-view mode or group-view mode). The techniques and architecture may improve annotation speed by automatically creating spatial ranking and ordering for videos. Thus, since the time it takes to annotate the videos is shorter, computing resources of the service provider network are not used as long, freeing up computing resources for processing of other data and/or other projects and/or services within the service provider network. The techniques and architecture may also improve annotation quality by automatically re-analyzing and possible re-grouping videos with low-quality labels (e.g., no labels or non-verified labels) and having the newly created groups be re-labeled for improved quality, thereby leading to an improved user experience.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1A, the service provider network 100 includes a labeling service 102 that may be used to label (annotate) image datasets. The service provider network 100 also includes a storage service 104. The service provider network 100 may, and generally does, include additional services not illustrated in FIG. 1A. A user 106 may use a client device 108 to access the service provider network 100 in order to obtain services from the service provider network 100.

In configurations, the user 106 may use the client device 108 to send a video image dataset 110 comprising a plurality of videos to the labeling service 102, which may store the video image dataset 110 in the storage service 104. The video image dataset 110 comprises video data related to a plurality of videos. The user 106 may also use the client device 108 to send category tags 112. In configurations, the video image dataset 110 and/or the category tags 112 may be stored in the storage service 104. Examples of category tags 112 may include, for example, tags related to subject matter with the videos, e.g., outdoors related activities, music, automotive, family, cooking, etc.

The labeling service 102 further includes a batch video content classification service 114 that includes a preprocessing service 116, an annotation service 118, and a verification service 120. As will be described further herein, the labeling service 102 may use the batch video content classification service 114 to automatically identify videos having high-content similarity, e.g., videos including similar content such that the videos are very related and group the videos together with one or more possible tags for the videos for consideration by annotators. Once the videos of the video image dataset 110 have been labeled, a labeled video dataset 122 may be provided to the client device 108 of the user 106.

Figure 1B:
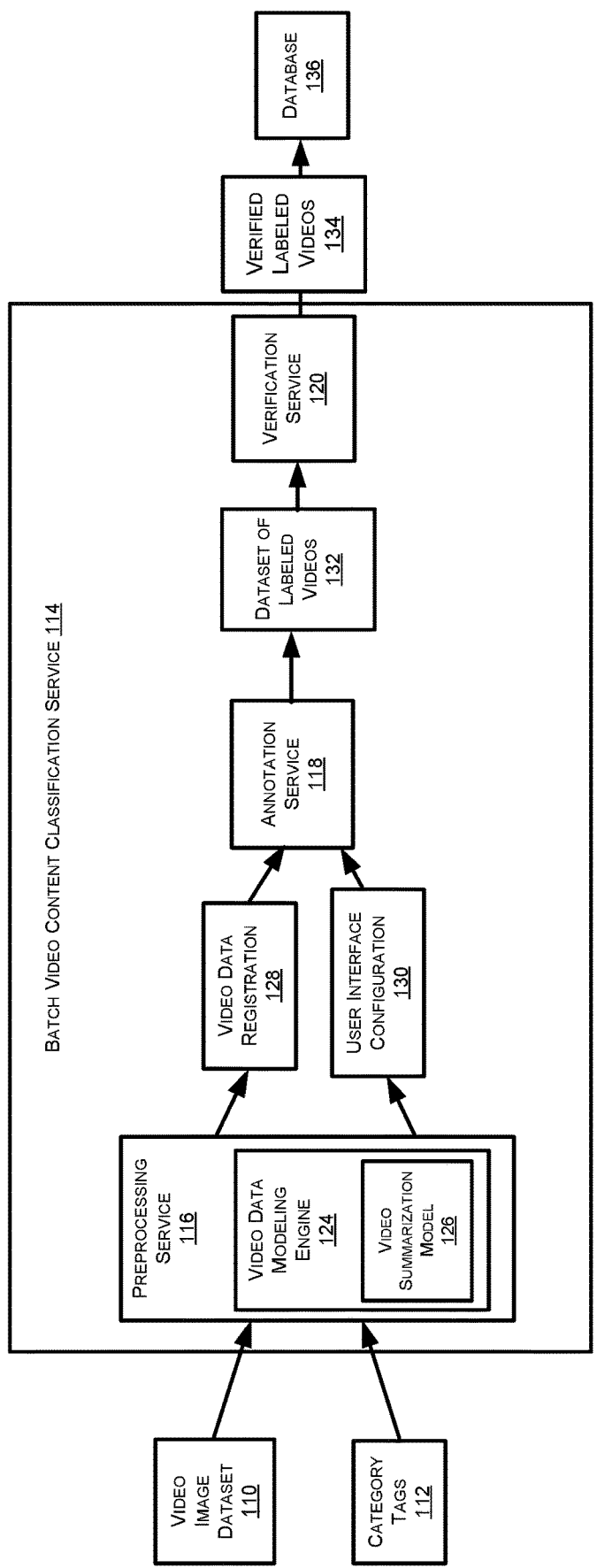
FIG. 1B schematically illustrates the batch video content classification service of the labeling service of FIG. TA.

FIG. 1B schematically illustrates the batch video content classification service 114. As can be seen in FIG. 1B, the video image dataset 110 and category tags 112 are provided to the preprocessing service 116, which includes a video data modeling engine 124. In configurations, the video data modeling engine 124 includes a video summarization model 126. For example, given a video, a fixed number of N frames may be fixed at regular intervals from the video. The fixed number of N frames may then be fed into the video summarization model 126 in the form of an image encoder trained with image-caption pairs (for example CLIP and BLIP) to extract their text-aligned embeddings. The mean of the embeddings may then be taken as the representation of the video. This representation vector is used as the input of a single-layer support vector machine (SVM), which can be interpreted as the last layer of a DNN. While the image encoder is pre-trained on a very large corpus, the SVM is trained on a small amount of labeled task-specific data.

The video data modeling engine 124 analyzes the video image dataset 110 and category tags 112, as will be further described herein. Based on the analysis, the video data modeling engine 124 provides video data representation 128 and a user interface configuration file 130 to the annotation service 118. The annotation service 118 labels at least some of the videos in the video image dataset 110 based on the video data representation 128 and the user interface configuration file 130 to provide a dataset 132 of labeled videos. The dataset 132 of labeled videos is provided to the verification service 120. Verified labeled videos 134 are provided to a database 136, which in some configurations is located in the storage service 104.

In configurations, the video data modeling engine 124 operates by extracting multi-model embeddings that describe the information in each video (e.g., audio transcriptions, video content, etc.). In configurations, the machine learning model used to extract the embeddings is generally using contrastive learning: embeddings are made closer for videos on similar topics, and further for videos on different topics. In addition to the raw video format, in configurations, the video data modeling engine may uses the video summarization model 126 to automatically extract video frames that adequately summarize the video's content. Often, the users may supply examples of labeled videos with the dataset and category tags. The examples of labeled videos may be used to train the models with the video data modeling engine. Additionally, videos from the video image dataset 110 that are successfully labeled by the batch video content classification service 114 of the labeling service 102 may be used to train the models of the video data modeling engine 124. When little labeled data is available, the batch video content classification service may employ an unsupervised approach (i.e., clustering) to facilitate each of these procedures.

Thus, as will be described more fully herein, referring to FIGS. 1A and 1B, the user 106 may use the client device 108 to provide a video image dataset 110 that includes a plurality of unlabeled videos to the labeling service 102. The user 106 may also use the client device 108 to provide category tags 112 to the labeling service 102. The batch video content classification service 114 uses the video data content engine 124 of the preprocessing service 116 to analyze the video image dataset 110 with respect to the category tags 112. The video data modeling engine 124 of the preprocessing service 116 operates as a routing algorithm that produces a confidence score that dictates how video data should be handled in the labeling pipeline. If a confidence score is high for a video, e.g., above a first threshold, the video data may be auto-labeled with a machine-generated classification.

In configurations, if a confidence score is medium, e.g., above a second threshold but lower than the first threshold, the video data may be labeled by human annotators as part of the annotation service 118 using the user interface configuration file 130, e.g., either as a group-view mode interface or a single-view mode interface, as described further herein. If a confidence score is low, e.g., below the second threshold, the video data may be labeled by human annotators using a conventional annotation interface. If either the group-view mode interface or the single-view mode interface should be used, the video data modeling engine automatically produces the user interface configuration file 130 that will be passed to the user interface in order to control how the video data should be presented to annotators of the annotation service 118, as described further herein.

In accordance with configurations described herein, the annotation service 118 of the batch video content classification service 114 reads a ranked list of videos (based on the confidence scores) in the video data representation 128 and the user interface configuration file 130 from the video data modeling engine 124 and presents videos and potential labels via one of the interfaces of FIGS. 3A-3D. In configurations, the single-view mode may be selected when a group of videos from the ranked list comprises only 1 video.

Using the ranked list in the video data representation 128 and the user interface configuration file 130, the annotation service 118 may render videos using one of the viewing modes and interfaces, e.g., a single-view mode and group-view mode. In the single-view mode, the single-view interface requires annotators to label videos one-by-one and is intended for uses where videos are dissimilar from other videos in the video image dataset 110. In the group-view mode, the group-view interface allows annotators to apply labels to several videos simultaneously. The group-view mode is specifically designed for use in labeling videos of high similarity (e.g., in which applying the same label among the videos is highly likely). For binary classification tasks, annotators can apply single labels to individual videos by clicking on the video, e.g., selecting the video with a mouse, which will assign the one and only label to the selected video(s). For multi-class classification tasks, annotators can select one or more labels at the same time and apply them in aggregate by clicking on a video. This second step requires that only a single annotator apply a label to a dataset of videos. The result of this second step is the dataset 132 of labeled videos.

In accordance with configurations described herein, the batch video content classification service 114 may create a subsequent labeling task that asks the verification service 120 to verify the labels assigned to videos by the annotation service 118. Similar to the annotation step, an annotator is asked to review the relevance of one label for each video in the video image dataset 110. However, unlike the annotation step, the batch video content classification service 114 may only ask the annotator to verify a subset of videos (e.g., dataset 132 of labeled videos) in the video image dataset 110 that have already been assigned a label by the annotation service 118. For example, if only 10 videos of a 1,000-video image dataset 110 were labeled by the annotation service 118, the verification task may ask the annotator to review just these 10 videos. The verification task's design is motivated by data that suggests that annotators produce an overabundance of false positives in the annotation step as a by-product of being encouraged to label video media that should "probably be labeled" with a given label. In other words, the annotation service 118 promotes making an overabundance of snap-decisions in order to reduce time in both the annotation step and the verification step. However, in configurations, the verification step may be omitted due to, for example, user instructions, user time requirements, user quality requirements, etc. In configurations, the verification process may include assigning a confidence score to the labeled video that reflects a confidence level with respect to the labeling of the video. Also, in configurations, videos that have been auto-labeled with a machine-generated classification due to having a high confidence score, e.g., above a first threshold, may or may not be verified depending on the user's desires and/or the configuration of the batch video content classification service 114.

After the verification service 120 is finished verifying labeled videos and all videos of the video image dataset 110 have been labeled, the verified labeled videos 134 may be stored in the database 136. The labeled image dataset 122, which includes the verified labeled videos 134 and any auto-labeled videos (due to high confidence scores) that have not been verified may be provided to the user 106 via the client device 108.

Figure 2:
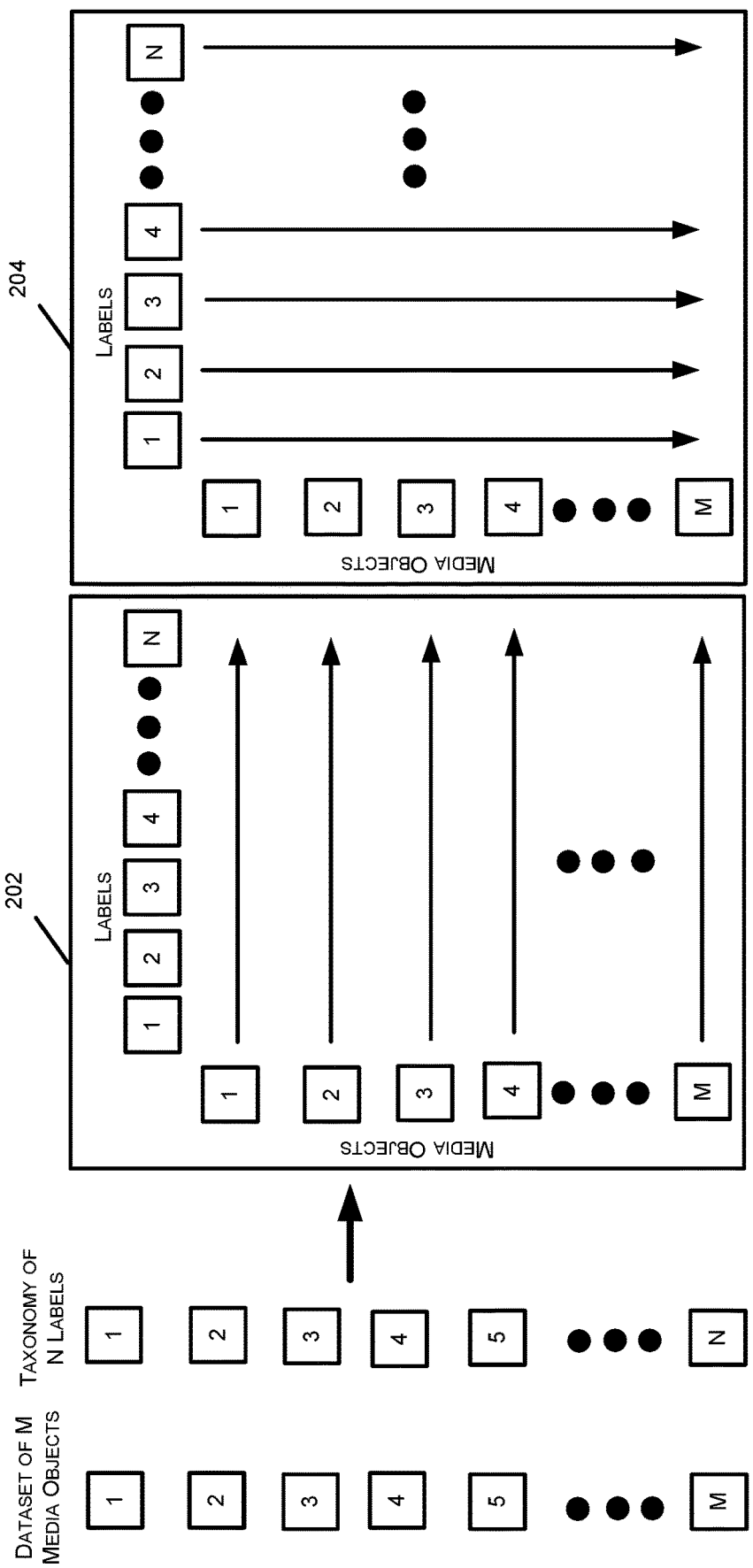
FIG. 2 schematically illustrates examples of classification approaches of a video data modeling engine of the batch video content classification service of FIGS. 1A and 1B.

Referring to FIG. 2, the video image dataset 110 comprises M unlabeled media objects (i.e., videos) and N category tags (labels) that should be used to label the videos of the video image dataset 110. The ultimate goal of video classification is to develop a mapping between the media objects and tags, which can be fundamentally framed in two approaches. In FIG. 2., a first approach 202 to classifying media objects with labels (tags) is to determine for each video, which labels apply. A second approach 204 to classifying media objects with labels (tags) is to determine for each label, which videos apply. In configurations, the video data modeling engine 124 of the preprocessing service 116 performs one or both of approach 202 and/or approach 204.

In configurations, a binary classification is an approach where only one label is determined for a set of media objects. The conventional manner in which to solve this problem requires that all media objects be examined by a human annotator. In such a situation, this requires that annotators assess and examine the relevance of a single label for each video in the dataset. A second approach is a multi-class classification. Again, the conventional manner in which to solve this problem requires that all media objects be examined by a human annotator. In such a situation, this requires that annotators assess and examine the relevance of all labels that might pertain to each video in the video image dataset 110. In configurations, the video data modeling engine 124 of the preprocessing service 116 performs either a binary classification or a multi-class classification for videos and tags.

Figure 3B:
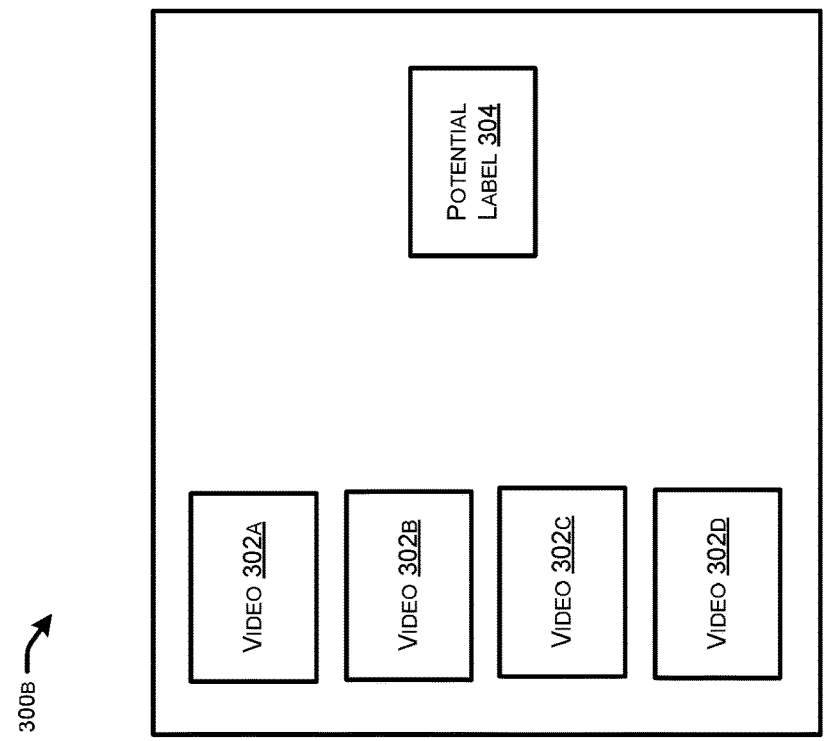
FIGS. 3A-3D schematically illustrate examples of binary and multi-class classification for single-view mode interface and a group-view mode interface of videos for labeling by annotators of an annotation service of the labeling service of FIG. TA.
Figure 3A:
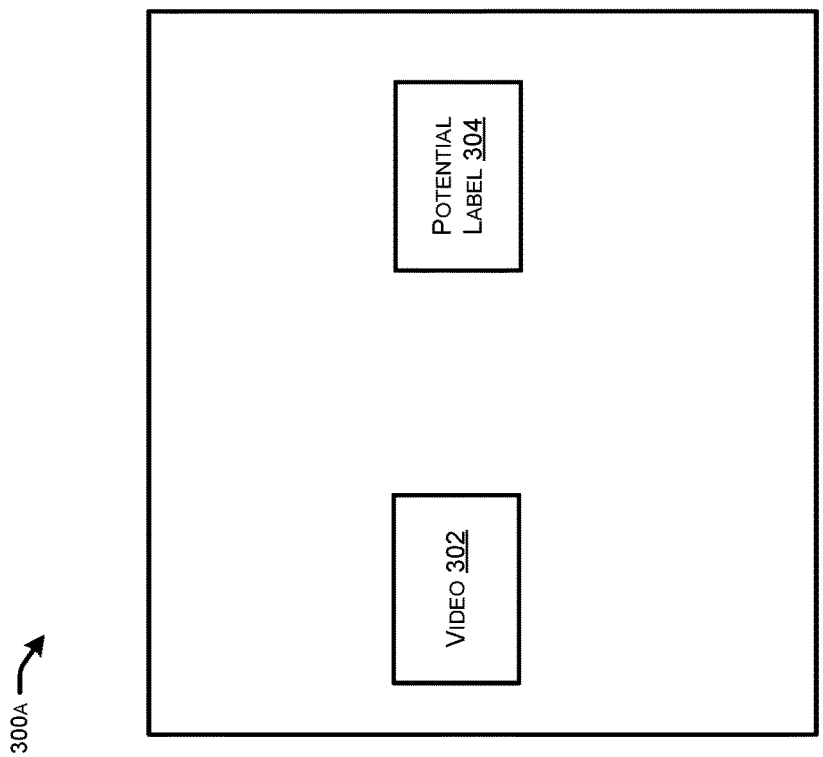

FIG. 3A illustrates a binary classification 300*a* for a single video 302, e.g., a single-view mode interface, on a display of a computing device. A single potential label (tag) 304 is also displayed. The potential tag 304 is determined for the single video 302 by the video data modeling engine 124, as described herein.

FIG. 3B illustrates a binary classification 300*b* for multiple videos 302*a*-302*d*, e.g., a group-view mode interface, on a display of a computing device. The single potential label (tag) 304 is also displayed. The potential tag 304 and multiple videos 302*a*-302*d* as a group are determined by the video data modeling engine 124, as described herein.

Figure 3D:
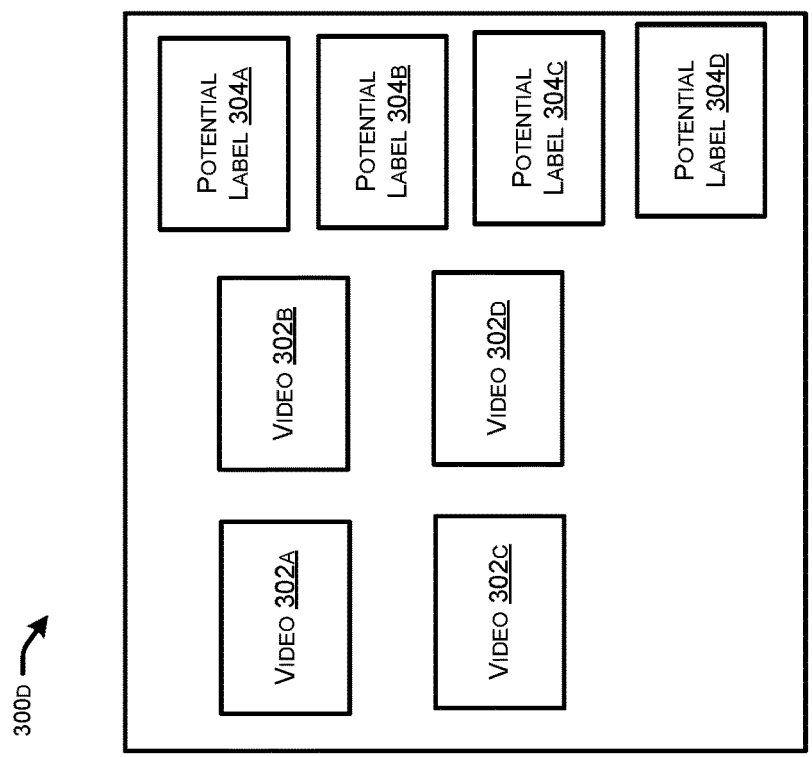
Figure 3C:
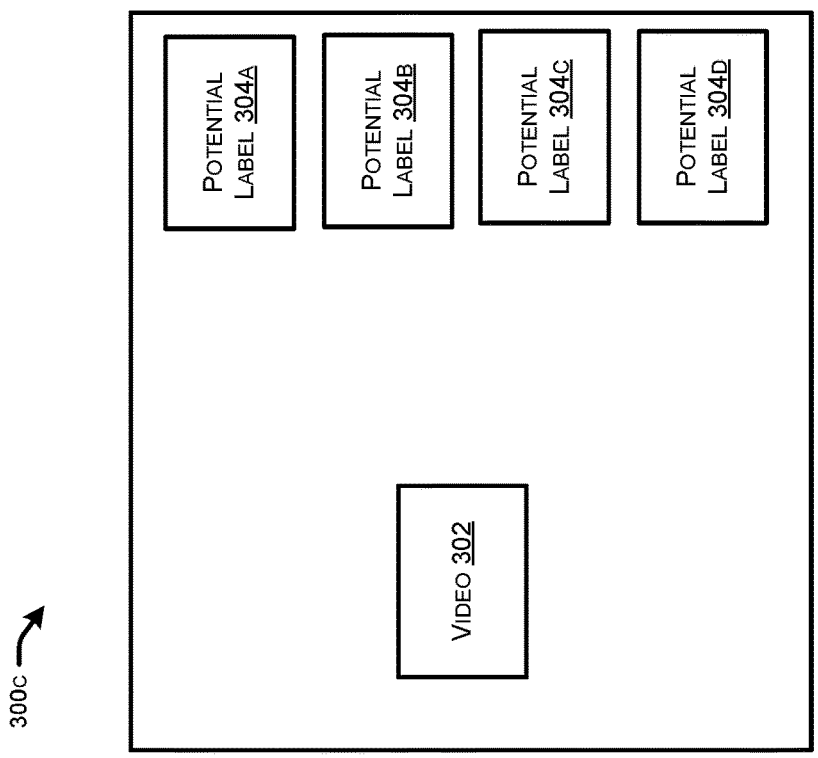

FIG. 3C illustrates a multi-class classification 300*c* for the single video 302, e.g., a single-view mode interface, on the display of the computing device. Multiple potential labels (tags) 304*a*-304*d* are also displayed. The potential tags 304*a*-304*d* are determined for the single video 302 by the video data modeling engine 124, as described herein.

FIG. 3D illustrates a binary classification 300*b* for multiple videos 302*a*-302*d*, e.g., a group-view mode interface, on a display of a computing device. The multiple potential labels (tags) 304*a*-304*d* are also displayed. The potential tags 304*a*-304*d* and multiple videos 302*a*-302*d* as a group are determined by the video data modeling engine 124, as described herein.

Referring back to FIG. 1B, in configurations, the video data modeling engine 124 of the preprocessing service 116 operates as a routing algorithm that produces a confidence score that dictates how video data should be handled in the labeling pipeline. If a confidence score is high for a video, e.g., above a first threshold, the video data may be auto-labeled with a machine-generated classification.

In configurations, if a confidence score is medium, e.g., above a second threshold but lower than the first threshold, the video data may be labeled by human annotators as part of the annotation service 118 using the user interface configuration file 130, e.g., either as a group-view mode interface or a single-view mode interface, as described further herein. For example, a binary classifier that predicts the probability that an example belongs to a single class may be used. The simplest model architecture is linear and may be trained with the logistic or hinge loss (e.g., SVM). A deep neural network (DNN) may also be used with one sigmoid output per binary classification problem.

If a confidence score is low, e.g., below the second threshold, the video data may be labeled by human annotators using a conventional annotation interface. If either the group-view mode interface or the single-view mode interface should be used, the video data modeling engine automatically produces the user interface configuration file 130 that will be passed to the user interface in order to control how the video data should be presented to annotators of the annotation service 118, as described further herein. For example, single videos are viewed with the single-view mode interface. Groups of videos may be viewed with either the group-view mode interface or the single-view mode interface.

Figure 4:
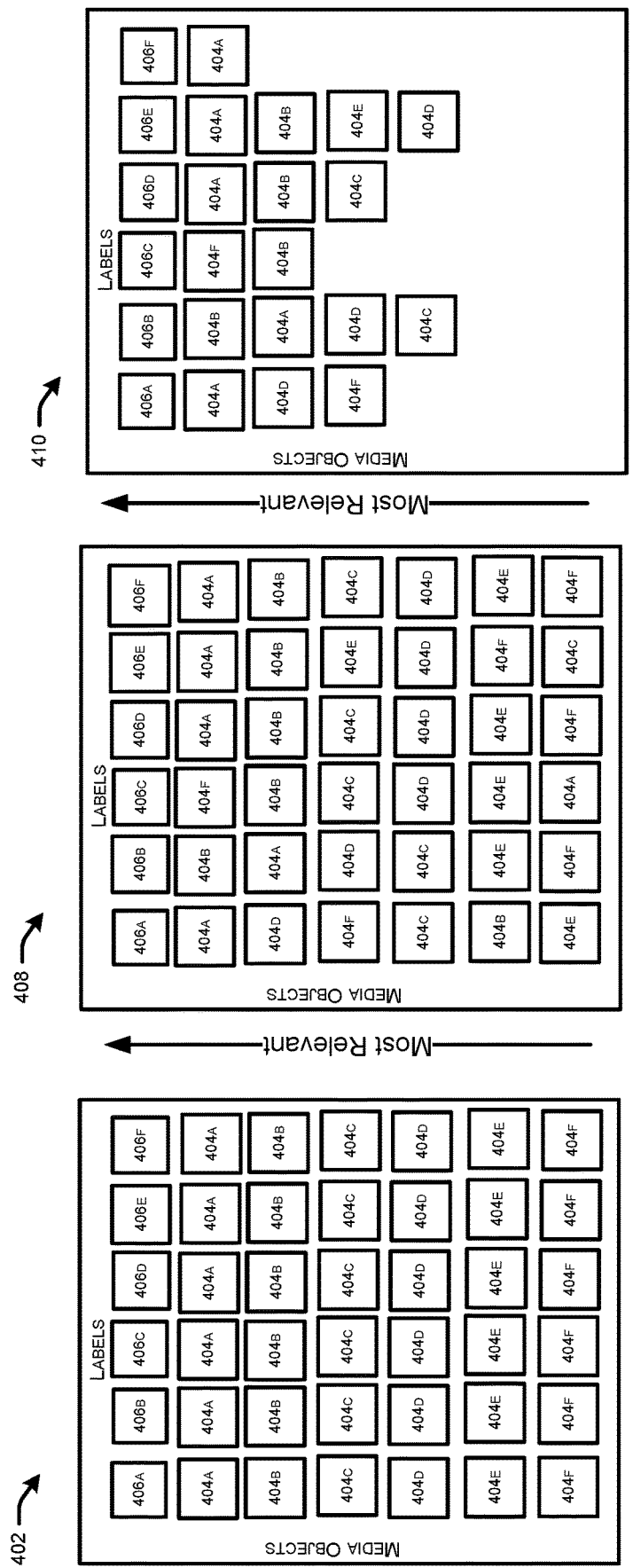
FIG. 4 schematically illustrates a ranked ordering of a video dataset for each label and a thresholding mechanism that is applied to the list used by the video data modeling engine of the batch video content classification service FIG. 1.

Referring to FIG. 4, in configurations, the video data modeling engine 124 calculates confidence scores using (1) a ranked ordering of the video image dataset 110 for each label and (2) a thresholding mechanism that is applied to the list, which is used as a heuristic to guide the video data modeling engine 124 in determining which interface, either the group-view mode interface or the single-view mode interface, should be used to label a given video. The premise of the ranked ordering is that videos that are "more relevant" to the label at hand should be shown to an annotator first. The practical reasoning behind the goal of producing these outputs is two-fold: 1) to direct video data to an appropriate labeling interface, e.g., single-view or group-view and 2) to, when possible, avoid sending video data to human annotators in any capacity.

At 402, a list of all media objects 404a-404f is created for each label 406a-406f in a static order. At 408, a ranked list of media objects 404a-404f is created for each label 406a-406f based on relevance. At 410, the ranked list is subjected to one or more thresholds. Based on the one or more thresholds, media objects 404a-404f that have a high enough confidence score are labeled with the corresponding label and removed from the list for that label. Media objects 404a-404f that have a low enough confidence score, e.g., did not meet a threshold, are removed from the list for that label. The remaining media objects 404a-404f may be provided as the video data representation 128 to an annotator at the annotation service 118 via an interface, e.g., one of the interfaces of FIGS. 3A-3D., for annotation as described herein.

In accordance with configurations described herein, the annotation service 118 of the batch video content classification service 114 reads the ranked list of videos in the video data representation 128 and the user interface configuration file 130 from the video data modeling engine 124 and presents videos and potential labels via one of the interfaces of FIGS. 3A-3D. In configurations, the single-view mode may be selected when a group of videos from the ranked list comprises only 1 video.

Using the ranked list in the video data representation 128 and the user interface configuration file 130, the annotation service 118 may render videos using one of the viewing modes and interfaces, e.g., single-view mode (FIGS. 3A and 3C) and group-view mode (FIGS. 3B and 3D). In the single-view mode, the single-view interface requires annotators to label videos one-by-one and is intended for uses where videos are dissimilar from other videos in the video image dataset 110. In the group-view mode, the group-view interface allows annotators to apply labels to several videos simultaneously. The group-view mode is specifically designed for use in labeling videos of high similarity (e.g., in which applying the same label among the videos is highly likely). For binary classification tasks, annotators can apply single labels to individual videos by clicking on the video, e.g., selecting the video with a mouse, which will assign the one and only label to the selected video(s). For multi-class classification tasks, annotators can select one or more labels at the same time and apply them in aggregate by clicking on a video. This second step requires that only a single annotator apply a label to a dataset of videos.

In configurations, an annotator may not label all of the videos presented to them. For example, the annotator may not agree with the label(s) presented to them by the video data modeling engine 124 by the preprocessing service 116. Additionally, the annotator may be undecided as to which label(s) may apply to the video(s). The videos that are not labeled may be re-analyzed by the video data modeling engine 124 and then presented to the same annotator or a different annotator. This may be especially practical as the models of the video data modeling engine 124 may be further trained with videos from the video image dataset 110 that have been successfully labeled.

In accordance with configurations described herein, the batch video content classification service 114 may create a subsequent labeling task that asks the verification service 120 to verify the labels assigned to videos by the annotation service 118. Similar to the annotation step, an annotator is asked to review the relevance of one label for each video in the video image dataset 110. However, unlike the annotation step, the batch video content classification service 114 may only ask the annotator to verify a subset of videos (e.g., dataset 132 of labeled videos) in the video image dataset 110 that have already been assigned a label by the annotation service 118. For example, if only 10 videos of a 1,000-video image dataset 110 were labeled by the annotation service 118, the verification task may ask the annotator to review just these 10 videos. The verification task's design is motivated by data that suggests that annotators produce an overabundance of false positives in the annotation step as a by-product of being encouraged to label video media that should "probably be labeled" with a given label. In other words, the annotation service 118 promotes making an overabundance of snap-decisions in order to reduce time in both the annotation step and the verification step. However, in configurations, the verification step may be omitted due to, for example, user instructions, user time requirements, user quality requirements, etc. In configurations, the verification process may include assigning a confidence score to the labeled video that reflects a confidence level with respect to the labeling of the video. Also, in configurations, videos that have been auto-labeled with a machine-generated classification due to having a high confidence score, e.g., above a first threshold, may or may not be verified depending on the user's desires and/or the configuration of the batch video content classification service 114.

In configurations, the batch video content classification service 114 acknowledges the verification as a criteria of success for producing high-quality labels. If a label-video pair is verified by the annotator, the verified labeled video 134 is added to the system output of high-quality data that may be stored in the database 136. In configurations, if verification fails, the batch video content classification service 114 may re-issue the verification task to a different annotator up to one or two times (or even more times if desired). If verification fails a third time, the video-label pair may be reanalyzed by the video data modeling engine or may flagged as being inappropriate for use in the batch video content classification service 114 and should be labeled by alternative means (e.g., a standard classification workflow). As previously noted, successfully labeled videos may be used to train the models of the video data modeling engine 124. Once all videos have been labeled, the labeling service 102 may provide a labeled dataset 122 to the client device of the user 106.

FIGS. 5 and 6 illustrate flow diagrams of example methods 500 and 600 that illustrate aspects of the functions performed at least partly by the services as described in FIGS. 1-4. The logical operations described herein with respect to FIGS. 5 and 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 5 and 6 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of the example method 500 for automatically identifying videos of a video dataset, e.g., video image dataset 110, having high-content similarity and grouping the videos together with one or more possible tags for the videos for consideration by annotators, e.g., the annotation service 118 of labeling service 102, within an on-demand computing platform, e.g., service provider network 100. At 502, a labeling service of a service provider network receives, from a client device, (i) a dataset of unlabeled videos and (ii) category tags related to content of the unlabeled videos for labeling the unlabeled videos. For example, the user 106 may use the client device 108 to send a video image dataset 110 comprising a plurality of videos to the labeling service 102, which may store the video image dataset 110 in the storage service 104. The video image dataset 110 comprises video data related to a plurality of videos. The user 106 may also use the client device 108 to send category tags 112. In configurations, the video image dataset 110 and/or the category tags 112 may be stored in the storage service 104.

At 504, a video modeling engine of the labeling service analyzes the dataset to provide a set of ranked unlabeled videos from the dataset, wherein the set of ranked unlabeled videos are ranked according to confidence scores with respect to at least one tag. For example, the video data modeling engine 124 analyzes the video image dataset 110 and category tags 112, as will be further described herein. Based on the analysis, the video data modeling engine 124 provides video data representation 128 and a user interface configuration file 130 to the annotation service 118. The annotation service 118 labels at least some of the videos in the video image dataset 110 based on the video data representation 128 and the user interface configuration file 130 to provide a dataset 132 of labeled videos. The dataset 132 of labeled videos is provided to the verification service 120. Verified labeled videos 134 are provided to a database 136, which in some configurations is located in the storage service 104.

In configurations, the video data modeling engine 124 operates by extracting multi-model embeddings that describe the information in each video (e.g., audio transcriptions, video content, etc.). In configurations, the machine learning model used to extract the embeddings is generally using contrastive learning: embeddings are made closer for videos on similar topics, and further for videos on different topics. In addition to the raw video format, in configurations, the video data modeling engine may uses the video summarization model 126 to automatically extract video frames that adequately summarize the video's content. Often, the users may supply examples of labeled videos with the dataset and category tags. The examples of labeled videos may be used to train the models with the video data modeling engine. Additionally, videos from the video image dataset 110 that are successfully labeled by the batch video content classification service 114 of the labeling service 102 may be used to train the models of the video data modeling engine 124. When little labeled data is available, the batch video content classification service may employ an unsupervised approach (i.e., clustering) to facilitate each of these procedures.

In configurations, the video data modeling engine 124 calculates confidence scores using (1) a ranked ordering of the video image dataset 110 for each label and (2) a thresholding mechanism that is applied to the list, which is used as a heuristic to guide the video data modeling engine 124 in determining which interface, either the group-view mode interface or the single-view mode interface, should be used to label a given video. The premise of the ranked ordering is that videos that are "more relevant" to the label at hand should be shown to an annotator first. The practical reasoning behind the goal of producing these outputs is two-fold: 1) to direct video data to an appropriate labeling interface, e.g., single-view or group-view and 2) to, when possible, avoid sending video data to human annotators in any capacity. At 402, a list of all media objects 404a-404f is created for each label 406a-406f in a static order. At 408, a ranked list of media objects 404a-404f is created for each label 406a-406f based on relevance. At 410, the ranked list is subjected to one or more thresholds. Based on the one or more thresholds, media objects 404a-404f that have a high enough confidence score are labeled with the corresponding label and removed from the list for that label. Media objects 404a-404f that have a low enough confidence score, e.g., did not meet a threshold, are removed from the list for that label. The remaining media objects 404a-404f may be provided as the video data representation 128 to an annotator at the annotation service 118 via an interface, e.g., one of the interfaces of FIGS. 3A-3D., for annotation as described herein.

At 506, based on the confidence scores, at least some of the set of ranked unlabeled videos are labeled with the at least one tag to provide a dataset of labeled videos, wherein (i) a first ranked unlabeled video having a first confidence score at or above a first threshold is automatically labeled with the at least one tag, (ii) a second ranked unlabeled video having a second confidence score at or above a second threshold that is less than the first threshold is presented to an annotator for manual labeling with the at least one tag, and (iii) a third ranked unlabeled video having a third confidence score below the second threshold is presented to the annotator for manual labeling with a tag from the category tags. For example, in accordance with configurations described herein, the annotation service 118 of the batch video content classification service 114 reads the ranked list of videos in the video data representation 128 and the user interface configuration file 130 from the video data modeling engine 124 and presents videos and potential labels via one of the interfaces of FIGS. 3A-3D. In configurations, the single-view mode may be selected when a group of videos from the ranked list comprises only 1 video.

At 508, at least some labeled videos of the dataset of labeled videos are verified with respect to the at least one tag to provide a verified dataset of labeled videos. For example, in accordance with configurations described herein, the batch video content classification service 114 may create a subsequent labeling task that asks the verification service 120 to verify the labels assigned to videos by the annotation service 118. Similar to the annotation step, an annotator is asked to review the relevance of one label for each video in the video image dataset 110. However, unlike the annotation step, the batch video content classification service 114 may only ask the annotator to verify a subset of videos (e.g., dataset 132 of labeled videos) in the video image dataset 110 that have already been assigned a label by the annotation service 118. For example, if only 10 videos of a 1,000-video image dataset 110 were labeled by the annotation service 118, the verification task may ask the annotator to review just these 10 videos. The verification task's design is motivated by data that suggests that annotators produce an overabundance of false positives in the annotation step as a by-product of being encouraged to label video media that should "probably be labeled" with a given label. In other words, the annotation service 118 promotes making an overabundance of snap-decisions in order to reduce time in both the annotation step and the verification step. However, in configurations, the verification step may be omitted due to, for example, user instructions, user time requirements, user quality requirements, etc.

At 510, the verified dataset of labeled videos is stored in a database. For example, in configurations, the batch video content classification service 114 acknowledges the verification as a criteria of success for producing high-quality labels. If a label-video pair is verified by the annotator, the verified labeled video 134 is added to the system output of high-quality data that may be stored in the database 136. In configurations, if verification fails, the batch video content classification service 114 may re-issue the verification task to a different annotator up to one or two times (or even more times if desired). If verification fails a third time, the video-label pair may be reanalyzed by the video data modeling engine or may flagged as being inappropriate for use in the batch video content classification service 114 and should be labeled by alternative means (e.g., a standard classification workflow). As previously noted, successfully labeled videos may be used to train the models of the video data modeling engine 124. Once all videos have been labeled, the labeling service 102 may provide a labeled dataset 122 to the client device of the user 106.

FIG. 6 illustrates a flow diagram of another example method 600 for automatically identifying videos of a video dataset, e.g., video image dataset 110, having high-content similarity and grouping the videos together with one or more possible tags for the videos for consideration by annotators, e.g., the annotation service 118 of labeling service 102, within an on-demand computing platform, e.g., service provider network 100. At 602, a labeling service of a service provider network receives, from a client device, (i) a dataset of unlabeled videos and (ii) category tags for labeling the unlabeled videos. For example, the user 106 may use the client device 108 to send a video image dataset 110 comprising a plurality of videos to the labeling service 102, which may store the video image dataset 110 in the storage service 104. The video image dataset 110 comprises video data related to a plurality of videos. The user 106 may also use the client device 108 to send category tags 112. In configurations, the video image dataset 110 and/or the category tags 112 may be stored in the storage service 104.

At 604, a machine learning (ML) model of the labeling service analyzes the dataset to provide a set of ranked unlabeled videos from the dataset, wherein the set of ranked unlabeled videos are ranked according to confidence scores with respect to at least one tag. For example, the video data modeling engine 124 analyzes the video image dataset 110 and category tags 112, as will be further described herein. Based on the analysis, the video data modeling engine 124 provides video data representation 128 and a user interface configuration file 130 to the annotation service 118. The annotation service 118 labels at least some of the videos in the video image dataset 110 based on the video data representation 128 and the user interface configuration file 130 to provide a dataset 132 of labeled videos. The dataset 132 of labeled videos is provided to the verification service 120. Verified labeled videos 134 are provided to a database 136, which in some configurations is located in the storage service 104.

In configurations, the video data modeling engine 124 operates by extracting multi-model embeddings that describe the information in each video (e.g., audio transcriptions, video content, etc.). In configurations, the machine learning model used to extract the embeddings is generally using contrastive learning: embeddings are made closer for videos on similar topics, and further for videos on different topics. In addition to the raw video format, in configurations, the video data modeling engine may uses the video summarization model 126 to automatically extract video frames that adequately summarize the video's content. Often, the users may supply examples of labeled videos with the dataset and category tags. The examples of labeled videos may be used to train the models with the video data modeling engine. Additionally, videos from the video image dataset 110 that are successfully labeled by the batch video content classification service 114 of the labeling service 102 may be used to train the models of the video data modeling engine 124. When little labeled data is available, the batch video content classification service may employ an unsupervised approach (i.e., clustering) to facilitate each of these procedures.

The video data modeling engine 124 calculates confidence scores using (1) a ranked ordering of the video image dataset 110 for each label and (2) a thresholding mechanism that is applied to the list, which is used as a heuristic to guide the video data modeling engine 124 in determining which interface, either the group-view mode interface or the single-view mode interface, should be used to label a given video. The premise of the ranked ordering is that videos that are "more relevant" to the label at hand should be shown to an annotator first. The practical reasoning behind the goal of producing these outputs is two-fold: 1) to direct video data to an appropriate labeling interface, e.g., single-view or group-view and 2) to, when possible, avoid sending video data to human annotators in any capacity. At 402, a list of all media objects 404a-404f is created for each label 406a-406f in a static order. At 408, a ranked list of media objects 404a-404f is created for each label 406a-406f based on relevance. At 410, the ranked list is subjected to one or more thresholds. Based on the one or more thresholds, media objects 404a-404f that have a high enough confidence score are labeled with the corresponding label and removed from the list for that label. Media objects 404a-404f that have a low enough confidence score, e.g., did not meet a threshold, are removed from the list for that label. The remaining media objects 404a-404f may be provided as the video data representation 128 to an annotator at the annotation service 118 via an interface, e.g., one of the interfaces of FIGS. 3A-3D., for annotation as described herein.

At 606, based at least in part on the confidence scores, at least some of the unlabeled videos are labeled with the at least one tag to provide a dataset of labeled videos. For example, in accordance with configurations described herein, the annotation service 118 of the batch video content classification service 114 reads the ranked list of videos in the video data representation 128 and the user interface configuration file 130 from the video data modeling engine 124 and presents videos and potential labels via one of the interfaces of FIGS. 3A-3D. In configurations, the single-view mode may be selected when a group of videos from the ranked list comprises only 1 video.

At 608, the dataset of labeled videos is stored in a database. For example, in configurations, the batch video content classification service 114 acknowledges the verification as a criteria of success for producing high-quality labels. If a label-video pair is verified by the annotator, the verified labeled video 134 is added to the system output of high-quality data that may be stored in the database 136. In configurations, if verification fails, the batch video content classification service 114 may re-issue the verification task to a different annotator up to one or two times (or even more times if desired). If verification fails a third time, the video-label pair may be reanalyzed by the video data modeling engine or may flagged as being inappropriate for use in the batch video content classification service 114 and should be labeled by alternative means (e.g., a standard classification workflow). As previously noted, successfully labeled videos may be used to train the models of the video data modeling engine 124. Once all videos have been labeled, the labeling service 102 may provide a labeled dataset 122 to the client device of the user 106.

Accordingly, the techniques and architecture described herein provide a machine-powered system architecture to automatically identify videos of high content similarity and arrange them in a grid-like interface for accelerated completion of labeling. More particularly, a labeling service of a service provider network includes a batch video content classification service that automatically identifies videos having high-content similarity and groups the videos together with one or more possible tags for the videos for consideration by annotators. In configurations, the batch video content classification service uses confidence scores with respect to one or more tags for the grouping of videos and if the confidence score is high, e.g., above a predetermined threshold, the batch video content classification service may label one or more of the videos. Thus, the techniques and architecture may enable the completion of video classification tasks with a novel annotation interface that supports single-view mode (i.e., labeling only one video) and group-view mode (i.e., labeling multiple videos at the same time). The techniques and architecture may also improve annotation speed by designing an annotation interface and workflow that encourages annotators to make rapid, snap-decisions for video classification, thereby saving resources and time and improving costs. The techniques and architecture may improve annotation speed by allowing annotators to simultaneously watch multiple videos and apply tags to them. The techniques and architecture may also improve annotation speed by automatically determining user interface mode (e.g., single-view mode or group-view mode). Thus, since the time it takes to annotate the videos is shorter, computing resources of the service provider network are not used as long, freeing up computing resources for processing of other data and/or other projects and/or services within the service provider network. The techniques and architecture may also improve annotation quality by automatically re-analyzing and possible re-grouping videos with low-quality labels (e.g., no labels or non-verified labels) and having the newly created groups be re-labeled for improved quality, thereby leading to an improved user experience.

Figure 7:
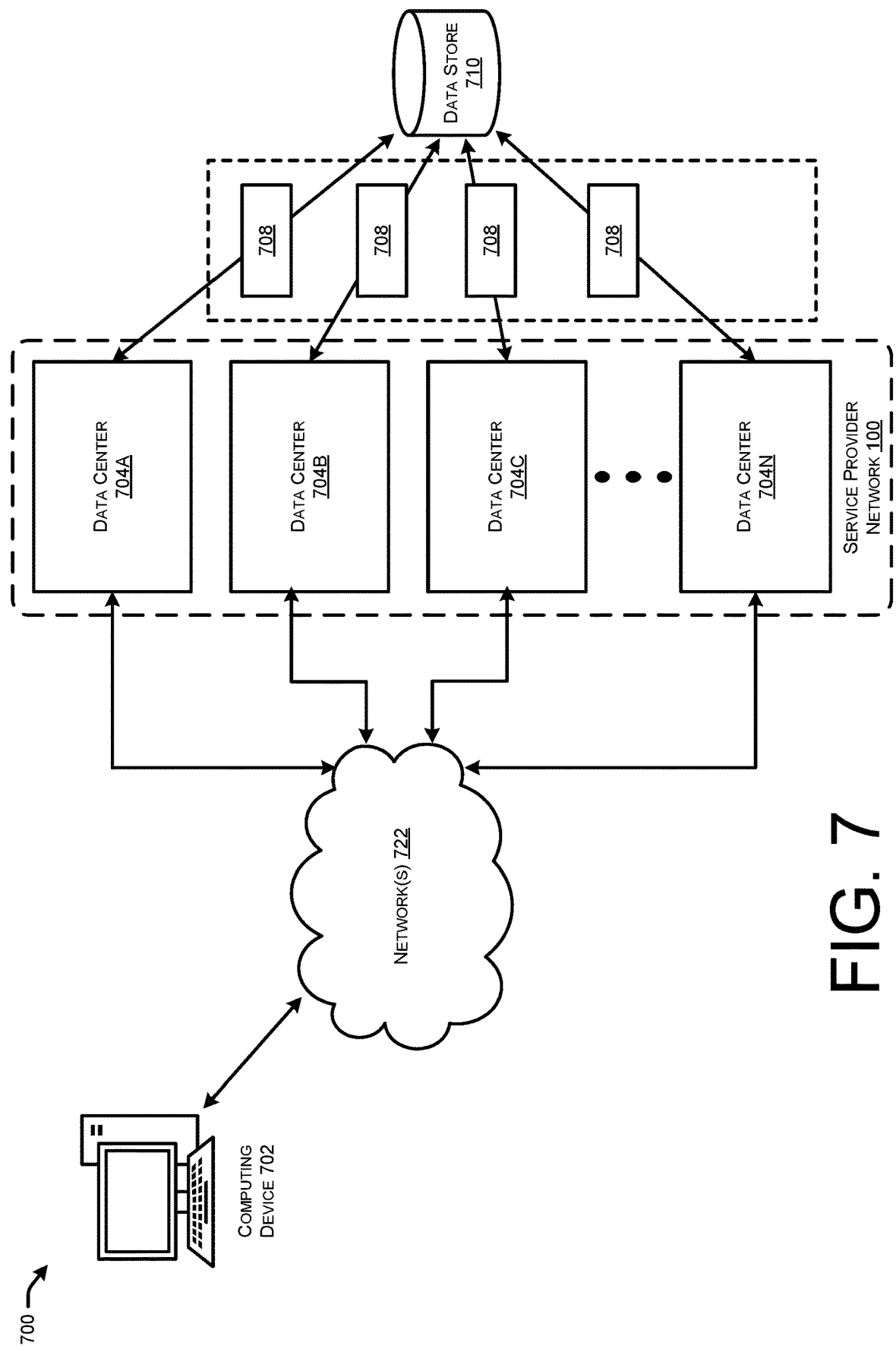
FIG. 7 is a system and network diagram that shows an illustrative operating environment that includes a service provider network that can be configured to implement aspects of the functionality described herein.

FIG. 7 is a system and network diagram that shows one illustrative operating environment 700 for the configurations disclosed herein that includes a service provider network 100 that can be configured to perform the techniques disclosed herein and which may be accessed by a computing device 702. The service provider network 100 can provide computing resources, like VM instances and storage, on a permanent or an as-needed basis. Among other types of functionality, the computing resources provided by the service provider network 100 may be utilized to implement the various services described above such as, for example, the labeling service 102.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 7.

The data centers 704 may be configured in different arrangements depending on the service provider network 100. For example, one or more data centers 704 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 722, which can be a wide area communication network ("WAN"), such as the Internet, an intranet or an Internet service provider ("ISP") network or a combination of such networks. For example, and without limitation, a computing device, e.g., computing device 702, operated by a user of the service provider network 100 may be utilized to access the service provider network 100 by way of the network(s) 722. It should be appreciated that a local-area network ("LAN"), the Internet, or any other networking topology known in the art that connects the data centers 704 to remote customers and other users can be utilized. It should also be appreciated that combinations of such networks can also be utilized.

Each of the data centers 704 may include computing devices that include software, such as applications that receive and transmit data 708. For instance, the computing devices included in the data centers 704 may include software components which transmit, retrieve, receive, or otherwise provide or obtain the data 708 from a data store 710. For example, the data centers 704 may include or store the data store 710, which may include the data 708.

Figure 8:
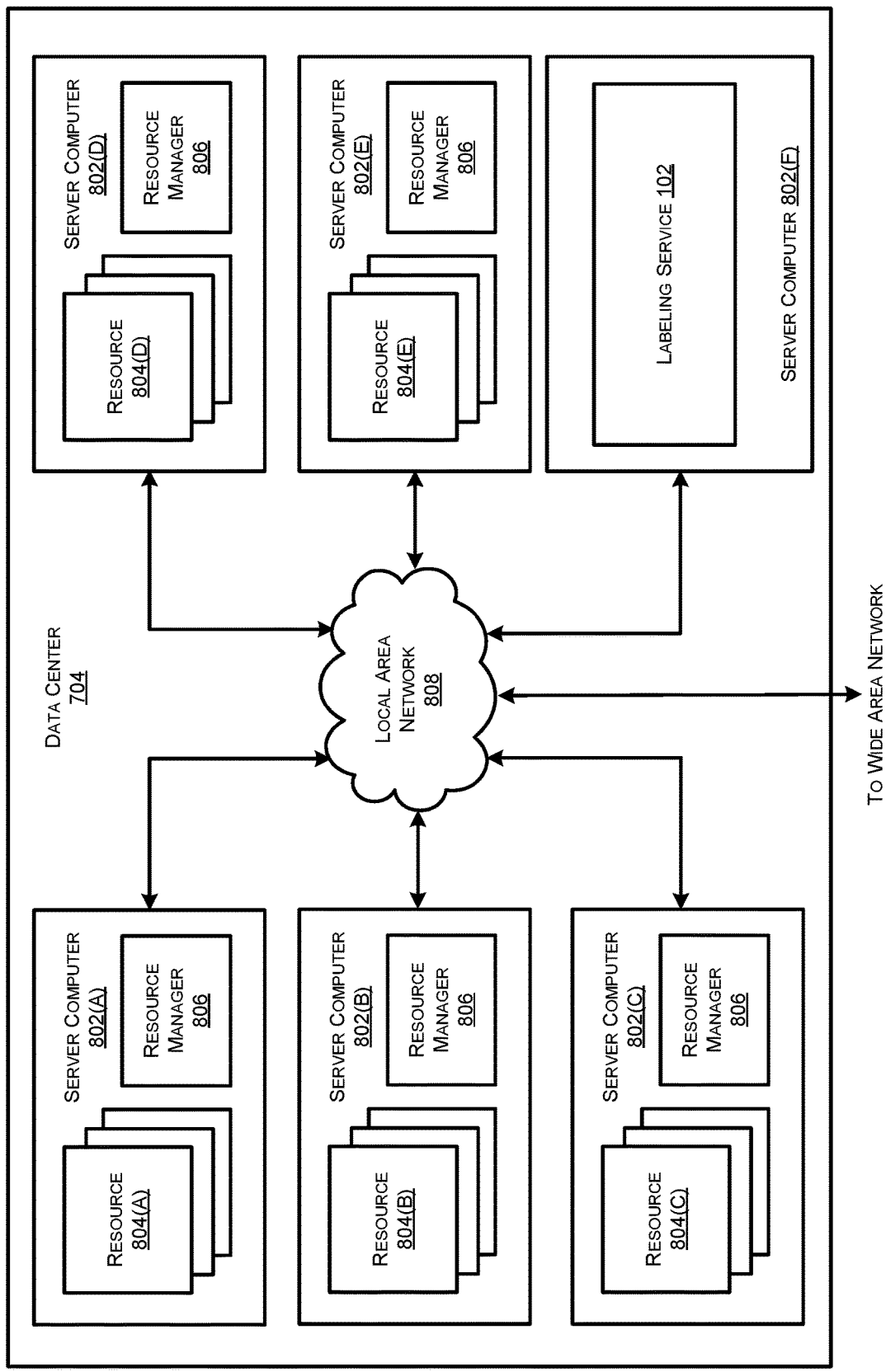
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rackmount, or blade server computers configured appropriately for providing the computing resources described herein (illustrated in FIG. 8 as the computing resources 804A-804E). As mentioned above, the computing resources provided by the service provider network 100 can be data processing resources such as VM instances or hardware computing systems, database clusters, computing clusters, storage clusters, data storage resources, database resources, networking resources, and others. Some of the server computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 7.

The data center 704 shown in FIG. 8 also includes a server computer 802F that can execute some or all of the software components described above. For example, and without limitation, the server computer 802F can be configured to execute components of the service provider network 100, including the labeling service 102, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
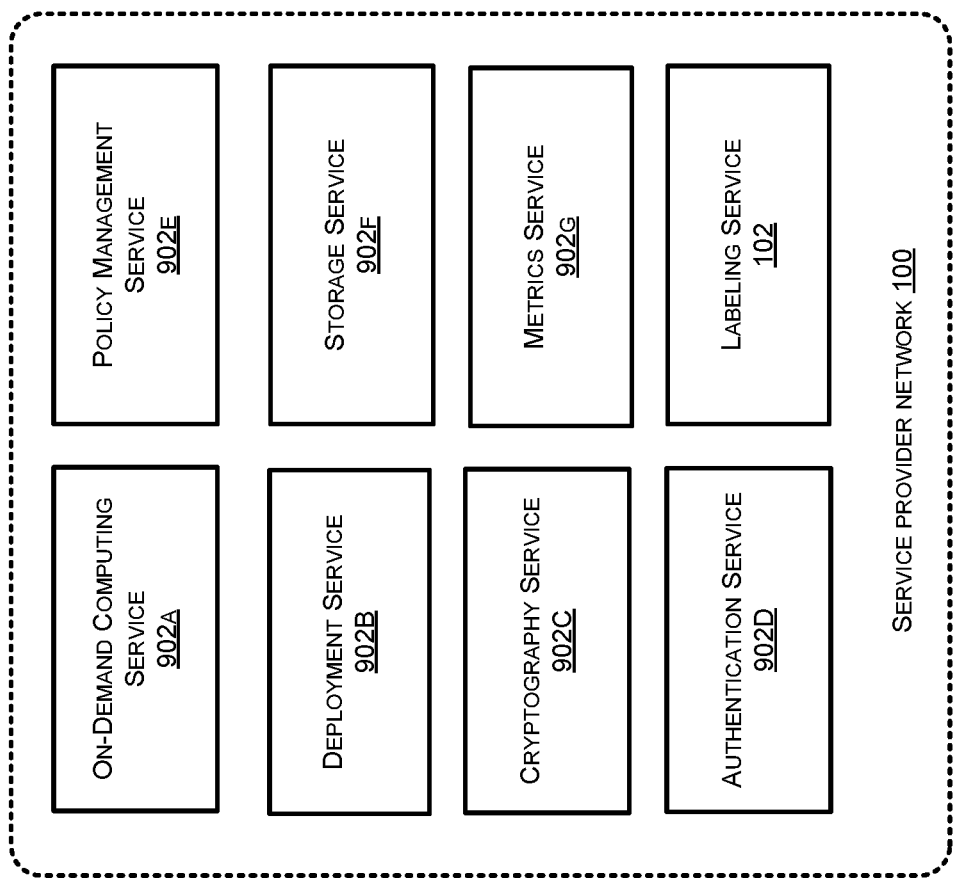
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the labeling service 102. The service provider network 100 can also provide other types of services including, but not limited to, an on-demand computing service 902A, a deployment service 902B, a cryptography service 902C, a storage service 902D, an authentication service 902E, and/or a policy management service 902G, some of which are described in greater detail below. Additionally, the service-provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 822 shown in FIG. 8. Communications from a user computing device, such as the client device 108 shown in FIG. 1A, to the service provider network 100 can cause the services provided by the service provider network 100 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A (can be a collection of computing resources configured to instantiate VM instances and to provide other types of computing resources on demand. For example, a customer or other user of the service provider network 100 can interact with the on-demand computing service 902A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 902C. The cryptography service 902C can utilize storage services of the service provider network 100 to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service provider network 100, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 100. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 902 based, at least in part, on the needs of its customers. For instance, the service provider network 100 can maintain a deployment service 902B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 10:
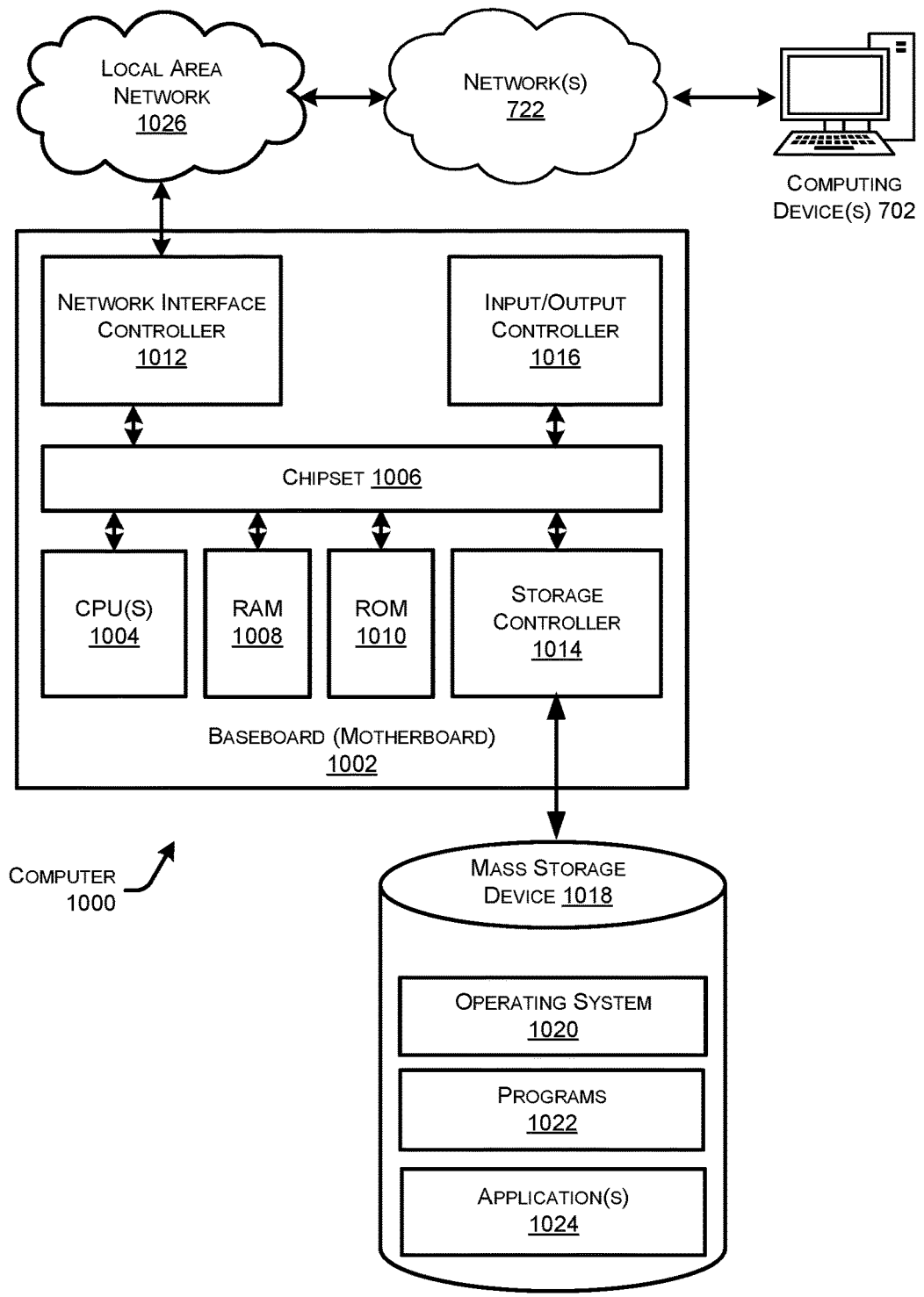
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices 702 and computer systems through a network, such as the network 1026. The chipset 1006 can include functionality for providing network connectivity through a Network Interface Controller (NIC) 1012, such as a gigabit Ethernet adapter. The NIC 1012 is capable of connecting the computer 1000 to other computing devices 702 over the network 1026 (or 722). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., agents, etc.), data, and/or applications(s) 1024, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 100, and or any components included therein, may be supported by one or more devices similar to computer 1000. Stated otherwise, some or all of the operations performed by the service provider network 100, and or any components included therein, may be performed by one or more computers 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-10. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may transmit, receive, retrieve, or otherwise provide and/or obtain data and/or results to and/or from the service provider network 100. The computer 1000 may store the data on the operating system 1020, and/or the programs 1022 that are stored in the mass storage device 1018 to update or otherwise modify the operating system 1020 and/or the programs 1022.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
    receiving, from a client device at a labeling service of a service provider network, (i) a dataset of unlabeled videos and (ii) category tags related to content of the unlabeled videos for labeling the unlabeled videos;
    analyzing, by a video modeling engine of the labeling service, the dataset to provide a set of ranked unlabeled videos from the dataset, wherein the set of ranked unlabeled videos are ranked according to confidence scores with respect to at least one tag;
    based on the confidence scores, labeling at least some of the set of ranked unlabeled videos with the at least one tag to provide a dataset of labeled videos, wherein (i) a first ranked unlabeled video having a first confidence score at or above a first threshold is automatically labeled with the at least one tag, (ii) a second ranked unlabeled video having a second confidence score at or above a second threshold that is less than the first threshold is presented to an annotator for manual labeling with the at least one tag, and (iii) a third ranked unlabeled video having a third confidence score below the second threshold is presented to the annotator for manual labeling with a tag from the category tags;
verifying at least some labeled videos of the dataset of labeled videos with respect to the at least one tag to provide a verified dataset of labeled videos; and
storing the verified dataset of labeled videos in a database;
selecting, by the video modeling engine, a group-view mode interface configured to present multiple videos simultaneously to the annotator on a display;
presenting on the display, to the annotator by the video modeling engine using the group-view mode interface, a group of ranked unlabeled videos having confidence scores at or above the second threshold and below the first threshold; and
labeling, by the annotator interacting with the group-view mode interface, one or more of the group of ranked unlabeled videos with the at least one tag.

2. The method of claim 1, further comprising:
presenting on the display, to the annotator by the video modeling engine using the group-view mode interface, multiple tags for labeling the group of ranked unlabeled videos; and
labeling, by the annotator, one or more videos of the group of ranked unlabeled videos with two or more of the multiple tags.

3. The method of claim 1, further comprising:
selecting, by the video modeling engine, a single-view mode interface configured to present single videos to the annotator on a display;
presenting on the display, to the annotator by the video modeling engine using the single-view mode interface, the second ranked unlabeled video having a confidence score at or above the second threshold and below the first threshold; and
labeling, by the annotator interacting with the single-view mode interface, the second ranked unlabeled video with the at least one tag.

4. The method of claim 3, further comprising:
presenting on the display, to the annotator by the video modeling engine using the single-view mode interface, multiple tags for labeling the second ranked unlabeled video; and
labeling, by the annotator, the second ranked unlabeled video with two or more of the multiple tags.

5. A method comprising:
receiving, from a client device at a labeling service of a service provider network, (i) a dataset of unlabeled videos and (ii) category tags for labeling the unlabeled videos;
analyzing, by a machine learning (ML) model of the labeling service, the dataset to provide a set of ranked unlabeled videos from the dataset, wherein the set of ranked unlabeled videos are ranked according to confidence scores with respect to at least one tag;
based at least in part on the confidence scores, labeling at least some of the unlabeled videos with the at least one tag to provide a dataset of labeled videos; and
storing the dataset of labeled videos in a database,
wherein (i) a first ranked unlabeled video having a first confidence score at or above a first threshold is automatically labeled with the at least one tag, (ii) a second ranked unlabeled video having a second confidence score at or above a second threshold that is less than the first threshold is presented to an annotator for manual labeling with the at least one tag, and (iii) a third ranked unlabeled video having a third confidence score below the second threshold is presented to the annotator for manual labeling with a tag from the category tags, and
wherein the method further comprises:
selecting, by the ML model, a group-view mode interface configured to present multiple videos simultaneously to the annotator on a display;
presenting on the display, to the annotator by the ML model using the group-view mode interface, a group of ranked unlabeled videos having confidence scores at or above a second threshold and below a first threshold; and
labeling, by the annotator interacting with the group-view mode interface, one or more of the group of ranked unlabeled videos with the at least one tag.

6. The method of claim 5, further comprising:
prior to storing the dataset of labeled videos in a database, reviewing, by a first annotator, at least some of the labeled videos of the dataset of labeled videos with respect to the at least one tag.

7. The method of claim 6, further comprising:
determining that a labeled video of the at least some of the labeled videos fails first verification by the first annotator;
reviewing, by a second annotator and based at least in part on the labeled video failing the first verification by the first annotator, the labeled video with respect to the at least one tag;
based at least in part on a first determination that the labeled video fails second verification by the second annotator, reviewing, by a third annotator, the labeled video with respect to the at least one tag; and
based at least in part on a second determination that the labeled video fails third verification by the third annotator, flagging the labeled video for labeling the labeled video via an alternative means.

8. The method of claim 6, wherein the confidence scores include a first confidence score and the method further comprises:
based at least in part on the reviewing, assigning, to the at least some of the labeled videos by the first annotator, a second confidence score with respect to the at least some of the labeled videos being labeled with the at least one tag.

9. The method of claim 5, further comprising:
presenting on the display, to the annotator by the ML model using the group-view mode interface, multiple tags for labeling the group of ranked unlabeled videos; and
labeling, by the annotator, one or more videos of the group of ranked unlabeled videos with two or more of the multiple tags.

10. The method of claim 5, further comprising:
selecting, by the ML model, a single-view mode interface configured to present single videos to the annotator on a display;
presenting on the display, to the annotator by the ML model using the single-view mode interface, the second ranked unlabeled video having a confidence score at or above the second threshold and below the first threshold; and
labeling, by the annotator interacting with the single-view mode interface, the second ranked unlabeled video with the at least one tag.

11. The method of claim 10, further comprising:
presenting on the display, to the annotator by the ML model using the single-view mode interface, multiple tags for labeling the first ranked unlabeled video; and
labeling, by the annotator, the first ranked unlabeled video with two or more of the multiple tags.

12. One or more computer-readable media storing computer-executable instructions that, when executed, cause one or more processors to perform operations comprising:
receiving, from a client device at a labeling service of a service provider network, (i) a dataset of unlabeled videos and (ii) category tags for labeling the unlabeled videos;
analyzing, by a machine learning (ML) model of the labeling service, the dataset to provide a set of ranked unlabeled videos from the dataset, wherein the set of ranked unlabeled videos are ranked according to confidence scores with respect to at least one tag;
based at least in part on the confidence scores, labeling at least some of the unlabeled videos with the at least one tag to provide a dataset of labeled videos; and
storing the dataset of labeled videos in a database,
wherein (i) a first ranked unlabeled video having a first confidence score at or above a first threshold is automatically labeled with the at least one tag, (ii) a second ranked unlabeled video having a second confidence score at or above a second threshold that is less than the first threshold is presented to an annotator for manual labeling with the at least one tag, and (iii) a third ranked unlabeled video having a third confidence score below the second threshold is presented to the annotator for manual labeling with a tag from the category tags, and
wherein the operations further comprises:
selecting, by the ML model, a group-view mode interface configured to present multiple videos simultaneously to the annotator on a display;
presenting on the display, to the annotator by the ML model using the group-view mode interface, a group of ranked unlabeled videos having confidence scores at or above a second threshold and below a first threshold; and
labeling, by the annotator interacting with the group-view mode interface, one or more of the group of ranked unlabeled videos with the at least one tag.

13. The one or more computer-readable media storing computer-executable instructions of claim 12, further comprising:
presenting on the display, to the annotator by the ML model using the group-view mode interface, multiple tags for labeling the group of ranked unlabeled videos; and
labeling, by the annotator, one or more videos of the group of ranked unlabeled videos with two or more of the multiple tags.

14. The one or more computer-readable media storing computer-executable instructions of claim 12, further comprising:
selecting, by the ML model, a single-view mode interface configured to present single videos to the annotator on a display;
presenting on the display, to the annotator by the ML model using the single-view mode interface, the second ranked unlabeled video having a confidence score at or above the second threshold and below the first threshold; and
labeling, by the annotator interacting with the single-view mode interface, the second ranked unlabeled video with the at least one tag.

15. The one or more computer-readable media storing computer-executable instructions of claim 14, further comprising:
presenting on the display, to the annotator by the ML model using the single-view mode interface, multiple tags for labeling the first ranked unlabeled video; and
labeling, by the annotator, the first ranked unlabeled video with two or more of the multiple tags.

\* \* \* \* \*